United States Patent [19]

Magid et al.

[11] 4,061,820

[45] Dec. 6, 1977

[54] SELF-ADHERING MATERIAL

[75] Inventors: Robert P. Magid, Ringoes, N.J.; Gerald Sly, Levittown, Pa.

[73] Assignee: Oxford Chemicals, Incorporated, New Brunswick, N.J.

[21] Appl. No.: 674,598

[22] Filed: Apr. 7, 1976

[51] Int. Cl.² .................. B32B 3/26; B32B 5/18; C09J 7/02

[52] U.S. Cl. .................. 428/311; 128/256; 156/295; 427/207 B; 427/207 C; 427/244; 427/275; 428/195; 428/310; 428/315; 428/343; 428/425

[58] Field of Search ............... 428/307, 310, 311, 343, 428/425, 195, 315; 427/244, 275, 207 R, 207 B, 207 C; 156/295; 128/156

[56] References Cited

U.S. PATENT DOCUMENTS

| | | | |
|---|---|---|---|
| 2,095,776 | 10/1937 | Von Hofe et al. | 427/275 X |
| 2,740,402 | 4/1956 | Scholl | 428/343 X |
| 2,988,461 | 6/1961 | Elchel | 428/307 |
| 3,245,406 | 4/1966 | Chardack | 428/195 X |
| 3,262,827 | 7/1966 | Kallander et al. | 428/343 X |
| 3,565,247 | 2/1971 | Brochman | 428/307 X |
| 3,649,436 | 3/1972 | Buese | 428/311 |
| 3,665,918 | 5/1972 | Lindquist et al. | 428/195 X |
| 3,763,858 | 10/1973 | Buese | 428/311 X |
| 3,769,119 | 10/1973 | Mizell et al. | 427/275 X |

*Primary Examiner*—Harris A. Pitlick
*Attorney, Agent, or Firm*—Amster & Rothstein

[57] ABSTRACT

A novel adhesive material comprising a plastic foam having at least a surface layer of open cells in which the surface layer of cells contains a pressure-sensitive adhesive composition formed by applying the adhesive to the foam, while the foam is maintained under pressure sufficient to cause the cell walls of the surface layer of cells to be exposed and be relatively flat so as to receive the adhesive. Upon the release of pressure, the cellular structure returns to its normal state and does not exhibit a tacky surface but will adhere to itself upon the application of pressure sufficient to expose the adhesive-containing cell walls.

7 Claims, No Drawings

SELF-ADHERING MATERIAL

This invention pertains to a novel adhesive-containing material. More particularly, the invention relates to an adhesive-containing material which exhibits the unique ability to adhere to itself, or to a non-adhesive-containing material of similar physical structure, but which does not have a tacky surface and exhibits little or no tendency to adhere to other objects or surfaces in its normal state.

The use of pressure-sensitive adhesives as coatings for tapes, wallcoverings, floor tiles and in other similar applications where a permanently tacky adhesive film or coating capable of firmly adhering to a wide variety of surfaces is required is extremely well-known. Although such adhesive coatings have a high degree of utility, their desirable properties are also responsible for certain limitations on their usefulness. For example, in many instances the ability of the adhesive to aggressively adhere to a wide variety of surfaces requires that the adhesive coating be covered with silicone-treated paper, or other similar material, to mask the adhesive prior to actual use. Without such a covering layer, the adhesive would indiscriminately stick to any surface with which it comes in contact. Thus, where the adhesive coating is applied to a tape, for example, the tape cannot readily be unwound from a roll because of the aggressive adherence of the adhesive to the back of the tape. Great care must be taken in using such adhesively-coated materials since, once they are contacted with any surface, they are not easily peelable or otherwise removable, particularly in those instances where the adhesive bond may be substantially in excess of the cohesive or tear strength of the object to which they are applied. Accordingly, the usual pressure-sensitive adhesive-coated tape, wallcovering or the like is designed for use in permanent applications where it will not be subjected to repeated application and removal.

A need exists in the art for an adhesive system which exhibits selective adherence properties, such that it will not firmly adhere to most surfaces or objects but will firmly adhere to itself, or to a limited number of other surfaces and will exhibit the additional property of being readily separable from itself, so that it can be re-used if desired. It will be readily apparent to those persons skilled in the art that such an adhesive system would be extremely useful as a low cost closure system which could be utilized in lieu of hooks, snaps, of the fastening systems sold under the trademark "Velcro"; as a bandage; or in any other environment where a self-closing or self-sealing property would be desirable.

It is an object of this invention to provide a novel adhesive-containing material exhibiting the ability to selectively adhere to itself, or to a non-adhesive-containing material having similar physical properties.

It is another object of this invention to provide a novel adhesive-containing material which is capable of adhering to itself, but which is readily separable to break the adhesive bond, without destruction of the material to which the adhesive is applied.

Yet another object of this invention is to provide a novel adhesive-containing material which is useful in self-sealing and self-closure applications.

A further object of this invention is to provide techniques for the preparation of the novel adhesive-containing material.

The above objects of the invention are accomplished by a novel material comprising plastic foam material, having a cellular structure in which the surface layer of cells is open and contains a pressure-sensitive adhesive composition. The material of the invention is readily distinguishable from prior art adhesive-coated foam materials (see, for example, U.S. Pat. No. 3,847,647), in that the foam material of the invention is not provided with a continuous adhesive surface coating and therefore, does not have the tacky feel normally associated with such surface coatings, or the ability to aggressively stick to any surface with which it may come in contact. In the absence of such a surface coating, the novel adhesive-containing foam material exhibits little or no tendency to stick to any surface, except to itself or to a non-adhesive-containing foam material; and then, only upon the application of pressure sufficient to expose the pressure-sensitive adhesive composition which is within the surface cell layer.

The novel adhesive material is formed by applying the adhesive to the plastic foam while the foam is maintained under a pressure sufficient to present a relatively flat surface to be adhesively coated and it is believed the novel properties of the adhesive of the invention are the result of the combination of the physical properties of the foam material and the method of application of the pressure-sensitive adhesive to the foam material. More particularly, microscopic examination of a typical foam material having a surface layer of open cells reveals that the cells appear to be irregularly-shaped 3, 4, and 5 sided, interconnected cup-like structures which are disposed at various angles to the surface of the foam material. Indeed, when the foam material is in the relaxed state, i.e., is not under pressure, the actual surface of the foam is defined by the leading edges of the sidewalls of the cells which are disposed at various angles to the actual surface of the foam and the open spaces therebetween. Accordingly, the actual surface of a layer of foam material is an open latticework and has relatively little solid surface. The application of pressure to the foam causes the cells to flatten-out, such that they present a relatively flat, solid surface to be coated with the pressure-sensitive adhesive. When the pressure is released, after application of the adhesive, the cells of the foam material return to their original shape, taking the adhesive with them. As a result, the cell walls which are beneath the plane defining the actual surface of the foam are coated with adhesive but there is no continuous adhesive film on the surface of the foam, because of the open latticework structure. As a result, the surface of the foam does not present a tacky feel to the hand and will not stick to most surfaces. For illustrative purposes, the foam surface and method of application of adhesive can be compared to an accordion. The relaxed state of the foam is comparable to the compressed state of the accordion, in that only edges are exposed and the bulk of the available surface is below the plane defined by these edges. The extension of an accordion would be comparable to the application of pressure to the foam, since it exposes the maximum surface.

It appears to be a unique characteristic of the adhesive-containing material of the invention that it is capable of firmly adhering to itself when two opposed surfaces of the adhesive-containing material are pressed together, utilizing ordinary hand or finger pressure, despite the fact that it will not adhere to any surface absent such pressure. Moreover, under ordinary conditions, the adhesive-containing material will not firmly adhere to most surfaces, e.g., to paper, wood, plastic, metal or glass surfaces, even when pressure is applied, although adhesion for such uses can be improved by employing larger amounts of adhesive or materials exhibiting greater adhesion. However, the novel adhesive-containing material of the invention does exhibit an ability to adhere to a non-adhesive-containing plastic foam material when pressure is applied. It is believed that this phenomenon is the result of the flattening and exposure of the cell walls by the application of pressure, coupled with the inability of the foam to return to its relaxed state upon release of the pressure, due to the bond created between the adhesive coating on the cell walls and the opposing cell walls. This would appear to be particularly true where both foam materials have been treated with adhesive in accordance with the method of the invention, since the possibility of an adhesive-to-adhesive bond is likely.

The nature of the foam material employed in the invention is not critical, provided only that the surface layer of cells of the foam has an open-cell structure and the foam has sufficient flexibility such that the cell walls can be brought into substantial alignment with the surface of the foam, upon the application of pressure, to expose the concealed adhesive deposited in those cells in accordance with the invention. Although flexible foams are preferred, because of the relative ease with which the cell walls will move into substantial alignment with the plane defining the surface of the foam to become exposed upon application of pressure, the invention is not limited to conventional flexible foamed plastics. It will be readily appreciated by those persons skilled in the art that so-called "rigid" foams may also be employed, provided that the surface layer of cells can be flexed as heretofore stated, and that the ability to achieve such flexing under normal hand or finger pressure will be dependent upon the thickness of the foam layer.

It is also well-known in the plastics art that most plastic materials can be formed into foamed plastics by the proper introduction of a gas and the setting of the expanded plastic mass and that this can be accomplished by various techniques, including the introduction of gaseous blowing agents; whipping a gas into a viscous plastic mass; or the release of gas as a reaction product of the ingredients in the plastic mixture. Further, it is well-known that the foamed plastic structures thereby produced may consist of discrete closed-cell units, or interconnected cells and that the size of the cells and the density of the foam may be controlled, depending upon the method employed to produce the foamed plastic. The present invention is not limited to any particular foaming technique or the chemical nature of the foamed plastic, provided only that it exhibits sufficient flexibility as heretofore stated; and that the surface layer of cells is open. To the extent that a particular foamed plastic is formed under conditions producing a closed-cell structure, an open-cell structure may be readily produced, in accordance with techniques which are well-known in the art, by cutting a film of the required thickness for the intended end-use from a block of the foam. This process, known as "peeling" which is well-known in the art, results in open cells which are exposed to the surface of the foam material.

Among the foamed plastic materials which may be utilized in accordance with the invention, are latex rubber foams; polyurethane foams, irrespective of whether they are derived from reactions with polyethers or polyesters; polyolefin foams, such as polyethylene and polypropylene; vinyl foams, such as those derived from vinyl chloride polymers; styrene polymer foams, such as polystyrene or those derived from acrylonitrile-styrene polymers; and foams derived from cellulose acetate, epoxy, phenolic, urea or silicone resins. The flexible foams formed from polyurethane, polyolefins and vinyl polymers are particularly preferred, but are not critical to the invention.

It will be readily appreciated that the thickness of the foamed plastic material is not a critical feature of the invention and will largely depend upon the desired end-use of the adhesive-containing material. For example, where the adhesive-containing material of the invention is intended for use in a self-adhering tape, such as a bandage or in a closure system, the layer of foam material may be quite thin; e.g., 10–100 mils, and be appropriately laminated to a backing material to satisfy strength, decorative or other requirements. On the other hand, it is equally possible to form thick blocks of foam having an adhesive-containing surface in accordance with the invention which could be utilized, for example, in combination with other self-adhering blocks or shapes of foam material to create packing systems for odd-shaped instruments or machines.

The nature of the pressure-sensitive adhesive material which is utilized in conjunction with the foamed plastic material is not a critical feature of the invention. The term "pressure-sensitive adhesive" as used in this application is intended to refer to those adhesives which, in dry, solvent-free form, are permanently tacky at normal ambient temperatures and firmly adhere to a variety of dissimilar surfaces without the need for activation by water, solvent or heat. An extensive variety of such adhesives has been developed and is well-known in the art. Generally, such adhesives are composed of a rubbery-type elastomer, combined with a liquid or solid resin tackifier component. Typical elastomeric materials include reclaimed rubber, styrene-butadiene rubber, polyisobutylene or butyl rubber, butadiene-acrylonitrile rubber, polyvinyl ethers and polyacrylate esters. Typical tackifiers include polyterpene resins, gum rosin, rosin esters and other rosin derivatives, phenolic resins, coumarone-indene resins and petroleum hydrocarbon resins. The pressure-sensitive adhesives may also include plasticizers, fillers, pigments, anti-oxidants and other materials designed to control viscosity, color or the like, or to protect the adhesive against degradation. It is well-known in the art that, depending upon the specific ingredients employed, the adhesive may be applied from a water-based or solvent-based formula, or may even be a 100% solids formula which is heat-cured into position.

Although the amount of adhesive applied to the foamed plastic material may vary over wide limits, depending upon such factors as the nature of the cellular structure of the foamed plastic material; the nature of the adhesive and the desired degree of adhesion in the final product, the amount of adhesive employed is subject to certain important functional limitations in order to achieve the basic objects of the invention. More particularly, the amount of adhesive put into the foamed plastic material should be sufficient to coat a substantial portion of the cell walls of the surface layer of cells but should be insufficient to either form a continuous adhesive film or coating on the surface of the foamed plastic material, or to cause internal adhesion which would interfere with the ability of the foamed plastic material to be flexed in order to expose the cell walls of the surface layer of cells. Such internal adhesion could result from the application of the adhesive composition to a substantial number of cells below the surface layer of cells.

As previously indicated, it is essential that the pressure-sensitive adhesive be applied to the plastic foam material while maintaining the foam under sufficient pressure to substantially align the cell walls within the plane defining the surface of the foam, i.e., to expose the walls of the surface layer of cells, so that they may be coated with adhesive. A variety of techniques may be employed for that purpose. For example, the adhesive may be sprayed onto the foam material while the foam material is maintained under sufficient pressure, to expose the cell walls. Alternatively, a conventional roll-coating or knife-coating technique may be employed. In the former technique, adhesive material is transferred from a trough to a pick-up roller immersed in it and foam material maintained under pressure is continuously coated with adhesive when fed between the transfer roller and a pressure roller. In the latter method, an adjustable knife-blade, bar or rod is employed to control the deposition of adhesive flowing onto a sheet of foam moving under the blade, while the foam is maintained under pressure sufficient to expose the cell walls.

In the preferred method of applying the pressure-sensitive adhesive to the plastic foam material, the adhesive is applied by means of an engraved roll having cells in the surface capable of temporarily holding the adhesive composition. The engraved roll, which is rotatable, is rotated in a pan containing the adhesive composition, having the excess adhesive removed by means of a doctor blade, and comes directly in contact with the face of the plastic foam material and a second roll, located behind the foam, acts as a substantially rigid support. Pressure is asserted against the engraved roller as it rotates in contact with the plastic foam layer, sufficient to ensure that the surface layer of cell walls is exposed. This technique is preferred, because it gives a substantial degree of control over the amount of adhesive actually deposited on the foam layer. For example, in a preferred embodiment, an engraved roll having a 150 line to 180 line screen with a quadrangular cell will deposit approximately 2.72 to 1.96 lbs. of adhesive solids, respectively, from solutions containing approximately 50% solids. Although the solids concentration of a particular adhesive composition is not a critical feature of the invention; conventional practice, well-known to those persons skilled in the art, has established that a smooth flow from an engraved applicator roller is acomplished by adhesive solutions containing roughly 50% solvent and 50% solids. Moreover, most water-based adhesives are made commercially available in solids contents varying from 47% to 55%.

The pressure between the engraved applicator roller and the back-up roller is not critical and will vary, depending upon the pressure required in order to expose the cell walls of the surface layer of cells which, in turn, will depend upon the nature of the plastic foam material.

Ordinarily, the pressure will not be less than 10 psi.

The invention will be further understood by reference to the following illustrative example:

In one preferred embodiment of the invention, a .031 thick open-cell vinyl foam is employed to form a bandage designed to hold a sterile pad in place on an extremity. The foam material is received in roll form and would be fed into a coater equipped with means for unwinding and transporting the foam, including tension controls, speed controls, means of applying pressure to the foam so that the surface layer of cells lays flat, means of winding up the finished product, and means for trimming and slitting the material to form finished products of various sizes.

Internal to the machine, an engraving mounted on appropriate journals and operating against a rubber impression roll, with a durometer of about 60 shore would be appropriately equipped with a pan to handle the adhesive and a doctor blade to remove the excess. Such an engraving would be a 150 line electro-engraving, calculated to deposit out of its quadrangular cells about 2.75 pounds of a 50% solids adhesive for each ream of 3,000 square feet.

The adhesive used may be an acrylic latex, suspended in water, having approximately a 50% solids content a viscosity of about 2000 centepoise. The machine is equipped with heated rolls, which may be either steam, oil or hot water heated, sufficient in quantity and heat capacity to drive off the moisture contained in the adhesive, or an enclosed oven with supporting idle rolls suitable heated with gas or steam heated air of sufficient temperature and viscosity to drive off the water.

The vinyl foam is fed from the unwind stand around such rolls as are required to maintain layflat, then fed through the nip created by the engraved roll and its rubber impression roll; thence to and through the hot roll section of the machine, and thence to rewind section. Nip pressure between the engraving and impression roll should be about 20 psi.

At the rewind, trim knives are used to trim any ragged edges and internal score cut knives may be used to trim to desired widths in the manufacturing process.

It will be apparent to those persons skilled in the art, that the absence of a continuous pressure-sensitive adhesive film on the surface of the foam not only prevents the adherence of the adhesive-containing material to other surfaces in the absence of the application of pressure, but also eliminates the problem of "blocking", i.e., the sticking together of layers of a rolled-up web of foam which would interfere with or prevent the unwinding of that web. Moreover, separation of the adhesive-coating foam material from itself, or another piece of foam, after it has been adhered together by the application of hand or finger pressure is greatly simplified, as compared to adhesive systems containing continuous adhesive films. Because the adhesive is discontinuous, the separation is self-propagating to a substantial degree and the difficult peeling and stripping action which is characteristic of most continuous pressure-sensitive adhesive films, is not present in the material of the invention. This characteristic renders the adhesive-containing material of the invention highly desirable as a closure means such as, for example, as part of disposable garments or masks in the health-care field. Closure can be simply accomplished by pressing together two opposed faces of adhesive-containing foam material, and opening is readily accomplished by the simple act of pulling the two layers apart.

It will be readily apparent to those persons skilled in the art that the adhesive-containing material of the invention may be laminated to a wide variety of films, fabrics, papers and the like, in order to form tapes, decorative coverings or other devices in which the selective adherence, self-adherence and easy removal characteristics are desired. For example, the foam may be laminated to polyethylene or to non-woven materials to form a bandage; laminated to decorative paper or plastics, which would be useful in self-closing packaging; or, laminated to cloth or non-woven fabrics, as fillers and stiffeners for clothing. A wide variety of other combinations and applications which take advantage of the unique features of this novel material will readily occur to persons of ordinary skill in the art.

What is claimed is:

1. An adhesive-containing material comprising a plastic foam material and a dry, solvent-free, permanently tacky adhesive composition, said plastic foam having a cellular structure including a surface layer of open cells, the actual surface of said foam being defined by the leading edges of the sidewalls of said surface layer of open cells, said sidewalls of said surface layer of open cells being coated with said adhesive composition, the amount of said adhesive composition being insufficient to form a continuous adhesive film on the actual surface of said plastic foam or to coat a substantial number of cells below said surface layer of open cells, said adhesive-containing material being incapable of adhering to any opposed surface without the application of pressure.

2. The material of claim 1, wherein said plastic foam is capable of being flexed by the application of pressure so as to cause said adhesive composition to be exposed at the plane defining the actual surface of said plastic foam.

3. The material of claim 1, wherein opposed surfaces of said adhesive-containing material may be adhered to each other by the application of pressure.

4. The material of claim 1, wherein said adhesive composition is applied to said foam while said foam is maintained under a pressure sufficient to cause said sidewalls of said surface layer of open cells to be substantially aligned with the actual surface of said plastic foam.

5. The material of claim 1, wherein said plastic foam is flexible.

6. The material of claim 1, wherein said plastic foam is a polyurethane foam.

7. An adhesive-containing material comprising a plastic foam material and a dry, solvent-free, permanently tacky adhesive composition, said plastic foam having a cellular structure including a surface layer of open cells, the actual surface of said foam being defined by the leading edges of the sidewalls of said surface layer of open cells, said plastic foam being sufficiently flexible such that the cell walls of said surface layer of open cells may be moved into substantial alignment with the actual surface of said plastic foam upon the application of pressure, said surface layer of open cells being coated with said adhesive composition, said adhesive composition having been applied to said plastic foam while said foam was maintained under a pressure sufficient to bring said cell walls into substantial alignment with the actual surface of said plastic film such that a substantial portion of said adhesive composition is located below the actual surface of said plastic foam in the absence of pressure on said foam, the amount of said adhesive composition being insufficient to form a continuous adhesive film on the surface of said plastic foam and insufficient to coat a substantial number of cells below said surface layer of open cells, said adhesive-containing material being incapable of adhering to any opposed surface without the application of pressure.

* * * * *